US006892947B1

(12) United States Patent
Jam et al.

(10) Patent No.: US 6,892,947 B1
(45) Date of Patent: May 17, 2005

(54) BARCODE EMBEDDING METHODS, BARCODE COMMUNICATION METHODS, AND BARCODE SYSTEMS

(75) Inventors: Mehrban Jam, Fremont, CA (US); Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/631,418

(22) Filed: Jul. 30, 2003

(51) Int. Cl.[7] ............................................... G06K 7/10
(52) U.S. Cl. ........................ 235/462.01; 235/462.24; 235/462.34; 235/462.08; 235/468; 235/487; 235/494
(58) Field of Search .................... 235/462.01, 462.24, 235/462.34, 462.08, 468, 487, 494

(56) References Cited

U.S. PATENT DOCUMENTS

| | | | |
|---|---|---|---|
| 5,930,369 A | 7/1999 | Cox et al. | |
| 6,243,480 B1 * | 6/2001 | Zhao et al. | 382/100 |
| 6,463,162 B1 | 10/2002 | Vora | |
| 6,484,933 B1 * | 11/2002 | Zimmerman et al. | 235/375 |
| 6,504,941 B2 | 1/2003 | Wong | |
| 6,522,770 B1 * | 2/2003 | Seder et al. | 382/100 |
| 6,631,404 B1 * | 10/2003 | Philyaw | 709/217 |
| 6,694,042 B2 * | 2/2004 | Seder et al. | 382/100 |
| 6,750,978 B1 * | 6/2004 | Marggraff et al. | 358/1.12 |
| 2001/0037455 A1 * | 11/2001 | Lawandy et al. | 713/176 |
| 2001/0051915 A1 * | 12/2001 | Ueno et al. | 705/39 |
| 2002/0170966 A1 * | 11/2002 | Hannigan et al. | 235/462.01 |
| 2003/0116630 A1 * | 6/2003 | Carey et al. | 235/462.09 |
| 2003/0141358 A1 * | 7/2003 | Hudson et al. | 235/375 |
| 2003/0141375 A1 * | 7/2003 | Lawandy | 235/494 |

OTHER PUBLICATIONS

U.S. Appl. No. 09/579,070; "A Method and Appratus for Generating and Decoding a Visually Significant Barcode"; Shaked et al.; filed May 25, 2000.
"CodePoint 1.0 for Mobile Phones"; www.international-wireless.com; May 13, 2003; 2 pps.
"Edge Detection"; Machine Vision; Chapter 5; 1995; pps. 144–145.
"Boundary Extraction"; Fundamentals of Digital Image Processing; Chapter 9; Sec. 9.5; 1989; pps. 357–359.

* cited by examiner

*Primary Examiner*—Steven S. Paik (57) ABSTRACT

Barcode data communication methods, barcode embedding methods, and barcode systems are described. According to one embodiment, a barcode data communication method includes accessing a composite image comprising a disguised barcode image incapable of being directly read from a base image by a barcode reader, extracting data corresponding to the barcode image from the composite image, modifying the data to provide the barcode image in a state wherein the barcode image may be directly read by a barcode reader, and reading the barcode image using the barcode reader after the modifying.

35 Claims, 7 Drawing Sheets

BARCODE EMBEDDING METHODS, BARCODE COMMUNICATION METHODS, AND BARCODE SYSTEMS

FIELD OF THE INVENTION

Aspects of the invention relate to barcode data communication methods, barcode embedding methods, and barcode systems.

BACKGROUND OF THE INVENTION

Object identification has received increased attention in recent decades. With increased popularity and reliance upon electronic devices and systems, it has been desirable to provide identification systems which may easily and quickly convey accurate information regarding an associated object without susceptibility to human errors.

One object identification arrangement utilizes radio frequency identification device (RFID) tags to communicate information regarding an associated object. The tags may be passive or active devices which communicate with an associated reader. The reader may provide an interrogation signal which results in the tags responding with identification information which may be received by the reader. Although applicable to some objects, tags are difficult to deploy in some cases, such as with printed images or magazine covers.

Barcoding is another commonly used process for product identification. Some barcode images may convey different types of information regarding an associated object. For example, the Universal Product Code (UPC) barcode image may provide manufacturer information as well as product information regarding a certain associated object in a plurality of vertical bars. A reader may be used to quickly and accurately retrieve encoded information from a barcode image regarding an associated product. The barcode image may be placed adjacent to and in optical communication with respect to the reader during a reading process.

More recently, other barcoding schemes have been introduced in an attempt to render more visually attractive barcode images. Some exemplary schemes transform the barcode image from an original shape into another form which may be accessed by sophisticated hardware and algorithms. For example, one scheme combines encoded data with a logo or other image providing a bi-level graphical representation containing the data which may be accessed by a reader. Although these arrangements may have relatively high data density, they have drawbacks of using digital signal processing of increased complexity and also modification of the original image which may be noticeable to a user. Other arrangements use a pattern of dots as opposed to vertical bars (e.g., vertical bars used in the UPC barcoding systems) in an effort to provide visually attractive barcode images. These arrangements have associated drawbacks of being highly visible to a user while including relatively low data content (e.g., a few bytes of data containing a uniform resource locator (URL)). At least some aspects of the disclosure provide improved barcoding apparatus and methods.

SUMMARY OF THE INVENTION

Aspects of the invention relate to barcode data communication methods, barcode embedding methods, barcode systems, and articles of manufacture.

According to one embodiment, a barcode data communication method comprises accessing a composite image comprising a disguised barcode image incapable of being directly read from a base image by a barcode reader, extracting data corresponding to the barcode image from the composite image, modifying the data to provide the barcode image in a state wherein the barcode image may be directly read by a barcode reader, and reading the barcode image using the barcode reader after the modifying.

According to another embodiment, a barcode system comprises a scanner configured to scan a composite image comprising a barcode image, wherein the barcode image comprises a plurality of bars incapable of being directly read from the composite image by a barcode reader, and processing circuitry coupled with the scanner and configured to extract data from the composite image and comprising lines corresponding to boundaries of the bars of the barcode image and to modify the extracted data to construct the barcode image, the modification comprising forming bars intermediate at least some of the lines corresponding to the bars of the barcode image.

According to yet another embodiment, an article of manufacture comprises a processor-usable medium comprising processor-usable code configured to cause processing circuitry to access a composite image comprising a base image and a barcode image, extract data from the composite image corresponding to the barcode image, the extracted data comprising a plurality of edges substantially oriented in a first direction, refine the extracted data to reduce edges of a second direction substantially transverse to the first direction providing the extracted data comprising a plurality of lines corresponding to a plurality of parallel bars of the barcode image, and reconstruct the barcode comprising creating a plurality of bars of the barcode image from the plurality of lines.

Other embodiments and aspects are disclosed.

DESCRIPTION OF THE DRAWINGS

FIG. 3 is a flow chart of an exemplary methodology for embedding a barcode image within a base image according to one embodiment.

DETAILED DESCRIPTION OF THE INVENTION

Aspects of the disclosure are directed towards apparatus and methods of embedding a barcode image within another image, also referred to as a base image. The barcode image may be embedded within the base image to make the barcode image less noticeable to a user. In one embodiment, the barcode image may be disguised within the base image wherein the barcode image may not be directly read from the base image using a barcode image reader. As described below, a barcode generation device may be used to extract barcode image data from the base and generate or reconstruct a corresponding barcode image which may be directly read by a barcode reader. The barcode reader may extract data encoded within the reconstructed barcode image. Data of the barcode image may correspond to a product, place, object or other entity which may be associated with the barcode image.

Figure 1:
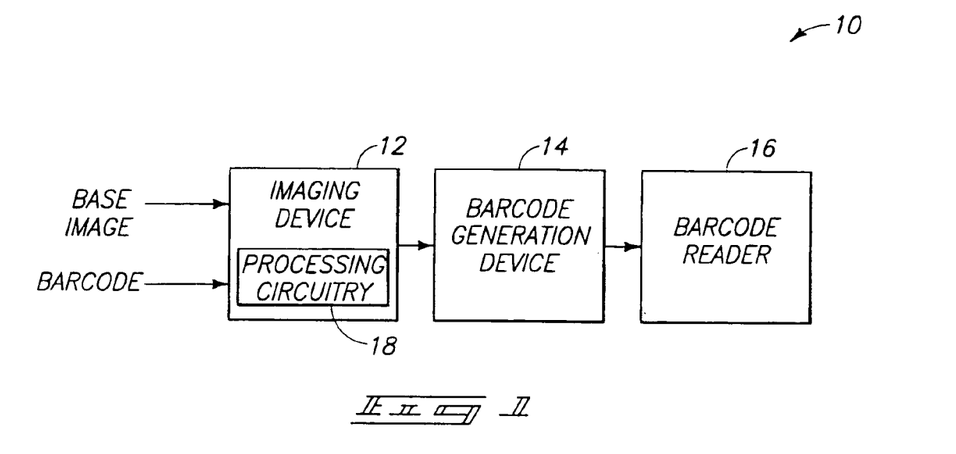
FIG. 1 is a functional block diagram of a barcode system according to one embodiment.

Referring to FIG. 1, an exemplary barcode system 10 according to one embodiment is shown. The depicted barcode system 10 includes an imaging device 12, a barcode generation device 14, and a barcode image reader 16. In one embodiment, imaging device 12 is configured to generate composite images from a barcode image and a base image. The barcode image may be disguised within the base image. Generation device 14 is configured to extract the disguised barcode image and to reconstruct the barcode image for subsequent reading. Barcode reader 16 operates to read the barcode image from the barcode generation device 14. Barcode generation device 14 and barcode reader 16 may be implemented as separate devices in one embodiment. In another arrangement, a single device may be provided to implement the functions of device 14 and reader 16.

Imaging device 12 is configured to access a base image and a barcode image to be embedded within the base image. The base image may be any suitable text and/or graphics image (e.g., product brochure, poster, label, etc.). The barcode image may comprise any suitable barcode format and may comprise a Universal Product Code (UPC) barcode image in one embodiment. The base image and barcode image may be accessed by imaging device 12 as electronic representations (e.g., files of digital information) in one embodiment. In another embodiment, base image and barcode image may be scanned by imaging device 12 to provide electronic representations. The base image and the barcode image may individually comprise a plurality of pixels. According to one arrangement, the barcode image specifies an entirety of the graphical content of the barcode image to be embedded within the base image.

In one embodiment, imaging device 12 comprises processing circuitry 18 to implement embedding operations of the barcode image within the base image. Processing circuitry 18 may access the electronic representations of the base image and barcode image. In one embodiment, the processing circuitry may comprise circuitry configured to implement desired programming. For example, the processing circuitry may be implemented as a processor or other structure configured to execute executable instructions including, for example, software and/or firmware instructions. Other exemplary embodiments of processing circuitry 18 include hardware logic, PGA, FPGA, ASIC, and/or other structures. These examples of processing circuitry are for illustration and other configurations are possible. Imaging device 12 may additionally comprise memory or other processor-readable media (not shown) configured to store programming and/or digital information.

In accordance with one exemplary embedding methodology, processing circuitry 18 of the imaging device 12 initially selects a location of the base image to embed the barcode image, and then embeds the barcode image at the selected location. The location is selected in one embodiment to minimize disturbance to the base image while providing extraction of the barcode image with minimal noise.

In one exemplary selection method, processing circuitry 18 analyzes four corners, if present, of the base image as possible candidates for embedding the barcode image. Other locations of the base image may also be analyzed as possible candidates for embedding. For black barcode images, relatively dark locations of the base image tend to provide better results with respect to the two above-mentioned criteria. If the corners or other locations are relatively bright, the barcode image may be inverted to comprise a white barcode image for subsequent embedding.

One example presenting exemplary details for embedding black barcode images is described. Processing circuitry 18 may access intensity values of the base image for pixels of interest corresponding to a possible location for embedding the barcode image. Processing circuitry 18 may obtain an average intensity value of the pixels for the location of interest and select the location having the lowest average intensity value for black barcode images. For a white barcode image, processing circuitry 18 may select the location having the greatest average intensity value.

The processing circuitry 18 may further analyze the locations with respect to providing the least amount of noise during extraction processes. In one embodiment, processing circuitry 18 may determine a plurality of differential intensity values for respective pixels with respect to the average calculated intensity value for a candidate location. Processing circuitry 18 may sum the respective difference values and select the location having the smallest summed values to select the location with the least associated noise. The results of the above-described analyses may be weighted to determine the location for embedding. Once the location is determined, pixels of the base image and pixels of the barcode image can be correlated or otherwise associated. Following correlation, intensity values of the pixels of the base image may be varied using respective pixels of the barcode image as described below.

Accordingly, in some arrangements, processing circuitry 18 may select a location for embedding a barcode image based upon the intensity (dark or bright) of the base image and/or the noise associated with extraction of the barcode image. In other arrangements, a user may instruct processing circuitry 18 to embed the barcode image at a desired location. Other methods may be used to select the appropriate location of the base image for embedding the barcode image in other embodiments.

Processing circuitry 18 embeds the barcode image within the base image to form a composite image in one embodiment. The embedded barcode image may be disguised to reduce or minimize the affect or impact to the base image resulting from the embedded barcode image. The barcode image may be embedded to an extent wherein the barcode image is incapable of being directly read by a barcode image reader configured to extract information from the barcode image. For example, for an exemplary UPC barcode image, the reader is unable to read the alternating vertical bars. As described below with respect to operations of barcode generation device 14, additional processing is implemented to extract and reconstruct the disguised barcode image to provide a barcode image which may be directly read by a barcode image reader.

In one exemplary barcode image embedding process, processing circuitry 18 operates to embed the barcode image using a blending process with controlled foreground intensity to provide a resultant composite image comprising the base image and the embedded barcode image. For example, given a base image I and an original barcode image B with a white (grayscale=255) background and a foreground (a group of bars with grayscale=0 in an exemplary UPC barcode embodiment), an embedding result R corresponding to the resultant composite image may be calculated as:

$$R(i,j)=k*[255-B(i,j)]+I(i,j)*B(i,j)/255 \qquad \text{eqn. 1}$$

where (i,j) is the pixel index of the selected location, and k is the control for intensity and is in a range of 0 to 1. In one embodiment using eqn. 1 for individual pixels, an entirety of the intensity of a pixel of the base image may be varied using the respective intensity of the pixel of the barcode image. In exemplary embodiments, intensity control k may be automatically selected corresponding to the calculated average intensity of the located embedding area in the base image, or selected manually. In one automatic selection embodiment, the pixel values of the embedding area may be summed and an average intensity A may be obtained. The barcode intensity control k may be selected as A/2550, that is, 10% of normalized average. Other automatic selection embodiments are possible.

Exemplary composite images having different values of intensity control k are illustrated and described below with respect to FIGS. 7A and 7B. Intensity control k controls the prominence or level of disguising of the barcode image within the base image. The blended barcode image may be either readily identified, barely visible, disguised or almost entirely disguised in different applications corresponding to the setting of the value of the intensity control k.

Following generation of the composite image, it may be desired to retrieve data encoded within the barcode image from the composite image. For example, if the barcode image comprises a UPC barcode, it may be desired to obtain the manufacturer code and the product code from the barcode image and regarding a product associated with the barcode image (e.g., the composite image itself), a product associated with the composite image (e.g., the composite image comprises a product label), or other appropriate product, object, place or other entity comprising or associated with the composite image.

Figure 2:
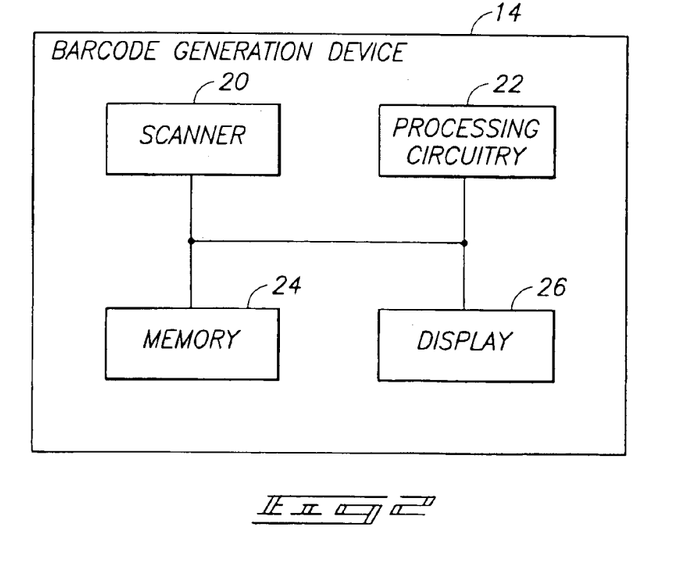
FIG. 2 is a functional block diagram of a barcode generation device of the system of FIG. 1 in accordance with one embodiment.

Referring to FIG. 2, an exemplary barcode generation device 14 is shown. Generation device 14 is configured to extract a disguised barcode image from a composite image and to present a reconstructed barcode image for reading. Generation device 14 comprises a scanner 20, processing circuitry 22, a memory 24, and a display 26 in the exemplary embodiment. Other configurations are possible.

Scanner 20 is configured to scan images, including composite images, and to provide an electronic representation of the scanned images for further processing. Scanner 20 may scan a portion or an entirety of a composite image. For example, if embedded barcode data is visible to a human, a user or other apparatus may configure scanner 20 to scan the respective portion of the composite image containing the barcode data.

Processing circuitry 22 is configured to access the electronic representation of the composite image from scanner 20. Processing circuitry 22 may comprise circuitry configured to implement desired programming. For example, the processing circuitry may be implemented as a processor or other structure configured to execute executable instructions including, for example, software and/or firmware instructions. Other exemplary embodiments of processing circuitry 22 include hardware logic, PGA, FPGA, ASIC, and/or other structures. These examples of processing circuitry are for illustration and other configurations are possible.

Memory 24 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Display 26 is configured to depict visual images. Exemplary configurations of display 26 include a cathode ray tube (CRT) display, liquid crystal display (LCD), or other configurations capable of producing a barcode image.

In one embodiment, processing circuitry 22 is configured to extract barcode data regarding a barcode image embedded within a composite image. Processing circuitry 22 is configured to modify the extracted barcode data to provide the barcode image in a state wherein the barcode image may be directly read by barcode reader 16. For example, the processing circuitry 22 may reconstruct the barcode image from the barcode data and control display 26 to depict a representation of the embedded barcode image comprising a reconstructed barcode image.

In one exemplary extraction implementation, processing circuitry 22 identifies a location of barcode data within the scanned composite image. A user or other apparatus may instruct processing circuitry 22 of the location of the barcode data within the scanned composite image. Alternately, or in addition to receiving location information, processing circuitry 22 may be configured to search the scanned composite image to locate the barcode data.

An exemplary search method utilizes an edge detector to locate the position of the barcode data within the composite image. In an illustrative example, the processing circuitry 22 may apply the edge detector to corners of the composite image. In one embodiment, an exemplary edge detector comprises a gradient-based edge detector. If the barcode image has features in a given direction, it may be desirable to use a directional edge detector. Further, a step edge detector may be used if the edges are known to have stepped edges. A roof edge detector may be suitable for other embodiments.

According to exemplary embodiments described herein, the barcode image may comprise a plurality of parallel lines having a common direction. For example, the barcode image may comprise a plurality of vertical bars, such as a UPC barcode image. An exemplary edge detector configured to detect vertical edges comprises the following edge detector:

$-1$ 0 1
$-2$ 0 2
$-1$ 0 1

The center of the edge detector is multiplied by the intensity of the subject pixel of interest and remaining values of the edge detector are multiplied by the respective intensity values of the neighbors of the center pixel. The determined values are added together and the result may be an edge-detection response at the center pixel. After the response values of all subject pixels are determined, a threshold is selected so that a pixel with a response value exceeding the threshold is indicated as comprising a vertical edge. In one embodiment, the threshold may be selected using the cumulative histogram of edge map so that 5 to 10% of pixels with largest responses are declared as edges. Other edge detectors may be used in other configurations.

Processing circuitry 22 may analyze the edge detection results to determine the density of determined edges. For example, processing circuitry 22 may monitor the density of vertical edges if the above edge detector is used. Processing circuitry 22 may determine the number of pixels comprising vertical edges for a given location of the composite image, and if a threshold such as 30% is exceeded, it may be determined that sufficient density of vertical edges is present corresponding to the presence of barcode data. Density information of edges may be determined for a plurality of different locations of the composite image (e.g., corners) and used to locate the embedded barcode image.

Following identification of a location of the barcode data, processing circuitry 22 may proceed to extract the barcode data from the composite image. In addition to usage of the edge detector to locate the barcode data, the edge detector may also be used to extract the barcode data.

For example, the edge detector may extract edges of a common direction from locations of interest of the composite image. The barcode data extracted by the edge detector may be refined by processing circuitry 22. It may be desired to reduce the presence of edges having a direction substantially transverse to the common direction of the extracted edges. For example, as mentioned above, the barcode image may comprise parallel vertical bars in one embodiment and it may be desired to remove edge pixels representing horizontal structures in the images after the edge detection. The edge detector discussed above tends to be limited to locating vertical edges. For other edge detectors, a gradient-based approach may be used to decide the orientation of the individual edges. Edge pixels having an orientation other than vertical may be discarded. Exemplary details for computing direction of a gradient are discussed in "Machine Vision," Jian et al., McGraw-Hill, Inc. (1995), pps. 144–145, the teachings of which are incorporated by reference.

Processing circuitry 22 may additionally perform an edge linking process to reduce discontinuities between respective edges which are supposed to be continuous. For example, upper and lower portions of a vertical line of an exemplary barcode image may be split into discontinuous portions during the embedding or extraction processes. Processing circuitry 22 may operate to link appropriate edges to reconstruct appropriate lines or other portions of the barcode image during the edge linking process. The edge linking process may also assist with separating edges of the barcode image from edges of the base image. Exemplary edge linking is discussed in "Fundamentals of Digital Image Processing," A. K. Jain, Prentice-Hall, Inc. (1989), pps. 357–359, the teachings of which are incorporated by reference.

Processing circuitry 22 may also filter the extracted data to remove relatively short edges after the linking processing described above. For example, processing circuitry 22 may identify dominant edges corresponding to lines of the barcode image (e.g., vertical lines of bars of a UPC barcode image). Dominant edges may be identified as the longest edge or a group of the longest edges. In one embodiment, processing circuitry 22 may remove edges not having a threshold length (e.g., lengths less than half of the length of the dominant edges) inasmuch as the relatively short edge segments are less likely to comprise edges of the barcode image. The processing described herein yields edges substantially corresponding to edges of the barcode image.

In accordance with the exemplary described processing, the remaining edges may correspond to a plurality of lines of the embedded barcode image. In the described UPC barcode image example, the lines may comprise a plurality of parallel vertical lines corresponding to boundaries of vertical bars of the barcode image. Processing circuitry 22 may operate to reconstruct the barcode image by filling in portions of the barcode image intermediate respective pairs of lines to form the vertical bars of an exemplary UPC barcode image. For an example having a white background, the processing circuitry 22 may fill black in between appropriate pairs of vertical lines to reconstruct the barcode image for display to barcode reader 16. Other extraction and reconstruction operations are possible in other embodiments.

After reconstruction of the barcode image, processing circuitry 18 may control the display 26 to visually depict the barcode image. Referring again to FIG. 1, barcode reader 16 may be arranged to read barcode images depicted using display 26. Barcode reader 16 may directly extract barcode data of the barcode image and process the barcode data to identify a product or other object associated with the barcode image in one embodiment. For example, barcode reader 16 may access an internal database (not shown) to provide information regarding a product or object associated with the barcode image. In the described exemplary UPC barcode example, the barcode reader 16 may comprise a UPC barcode reader configured to read barcode data directly from a plurality of vertical bars of the reconstructed barcode image.

Referring to FIG. 3, an exemplary methodology to embed a barcode image within a base image is depicted. The methodology of FIG. 3 may be implemented using processing circuitry 18 of imaging device 12 in one embodiment. Other methods are possible including more, less, or alternative steps.

At an initial step S10, the processing circuitry operates to access a base image to be used in the embedding process. For example, the processing circuitry may access an electronic representation (e.g., file) of the base image.

At a step S12, the processing circuitry operates to access a barcode image to be used in the embedding process. For example, the processing circuitry may access an electronic representation (e.g., file) of the barcode image. Alternately, the processing circuitry may construct an electronic representation of a barcode image or otherwise access or provide a barcode image for embedding.

At a step S14, the processing circuitry may select an appropriate location within the base image to embed the barcode image. In an example mentioned above, the processing circuitry may select the location to minimize disruption to the base image and/or provide extraction of the barcode data from the base image with the least amount of noise. Other criteria may be used in other embodiments.

At a step S16, the processing circuitry operates to embed the barcode image within the base image providing a composite image having a disguised barcode image. Various intensities of the barcode image data may be used to alter the level of disguise of the base image.

Figure 4:
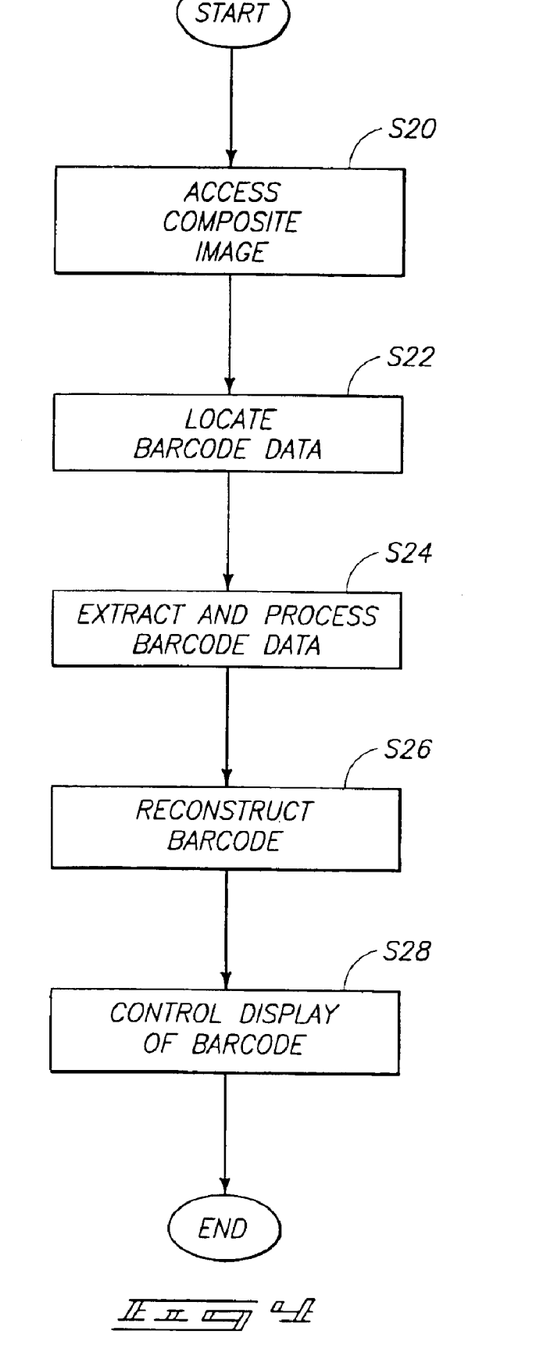
FIG. 4 is a flow chart of an exemplary methodology for extracting data of a barcode image embedded within a composite image according to one embodiment.
Figure 5:
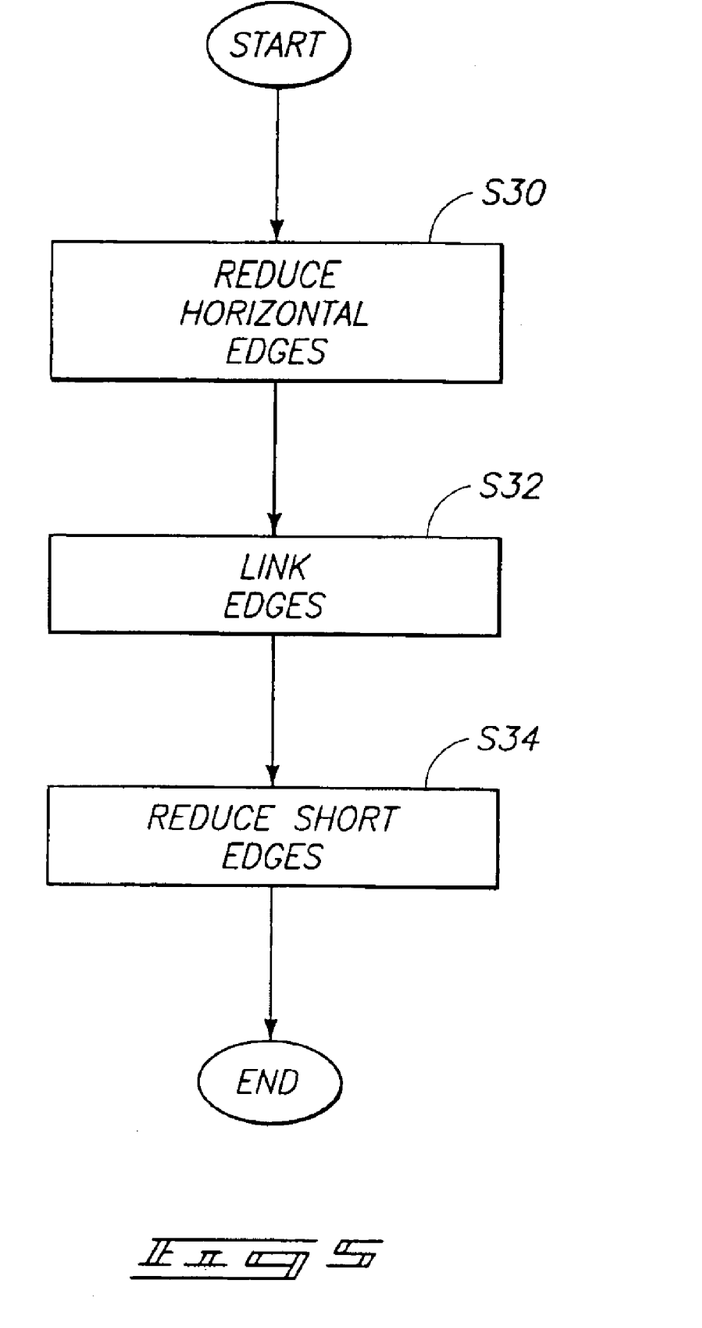
FIG. 5 is a flow chart of an exemplary methodology for refining extracted barcode image data according to one embodiment.

Referring to FIGS. 4 and 5, exemplary methodologies to retrieve an embedded, disguised barcode image from a composite image are depicted. The methodologies of FIGS. 4 and 5 may be implemented using processing circuitry 22 of barcode generation device 14 in one embodiment. Other methods are possible including more, less, or alternative steps.

Referring specifically to FIG. 4, at a step S20, the processing circuitry accesses an electronic representation of a composite image comprising a base image and an embedded, disguised barcode image.

At a step S22, the processing circuitry locates barcode data within the composite data. The processing circuitry may access a user specified portion of the composite image, search the composite image, or perform other processing to locate the barcode data within the composite image.

At a step S24, the processing circuitry extracts the barcode data from the composite image. An exemplary edge detection process is used in one embodiment to extract the barcode data. Additional exemplary details for processing extracted barcode data are described in FIG. 5.

At a step S26, the processing circuitry reconstructs the barcode image. According to the one UPC barcode example, the processing circuitry may fill in one of black or white intermediate appropriate pairs of adjacent vertical lines to reconstruct the barcode image.

At a step S28, the processing circuitry may control an associated display to depict the barcode image for direct reading by a barcode reader.

Referring specifically to FIG. 5, exemplary processing of extracted barcode data of an exemplary UPC barcode image is described. Other processing may be provided in other embodiments, including processing of other types of barcode images.

At a step S30, the processing circuitry accesses extracted barcode data comprising a plurality of edge segments. In accordance with the UPC barcode example, the processing circuitry operates to reduce the presence of horizontal edges in the barcode data.

At a step S32, the processing circuitry operates to link respective edge segments to correct errors introduced by embedding and/or extraction.

At a step S34, the processing circuitry identifies dominant edges and reduces edges not having a threshold length (e.g., removal of an edge not having a length at least 50% of the identified dominant edges). Other processing may be performed in other embodiments.

Figure 6:
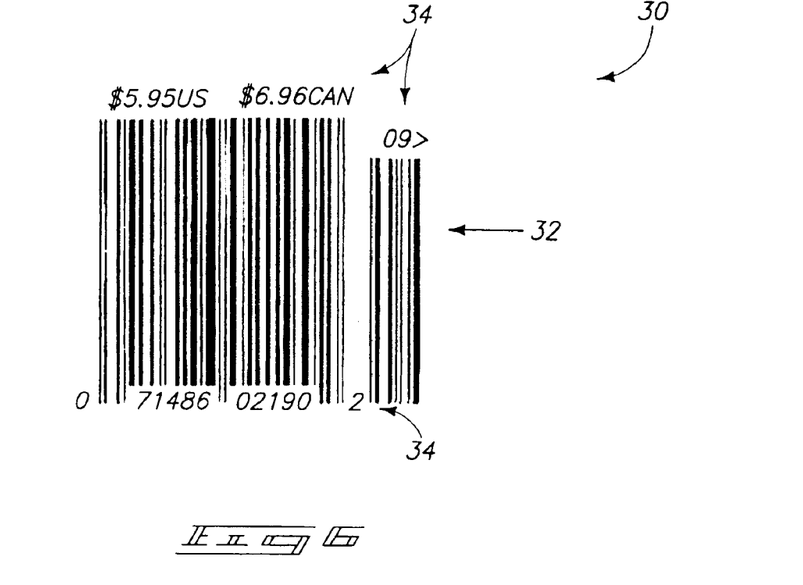
FIG. 6 is an illustrative representation of a barcode image according to one embodiment.

Referring to FIG. 6, an exemplary barcode image 30 comprising a UPC barcode image is depicted before an embedding operation. As shown, the barcode image 30 comprises a plurality of parallel vertical bars 32 and associated indicia 34. Bars 32 and indicia 34 comprise the same information (e.g., manufacturer code and product code) in one embodiment. In some configurations, bars 32 are the only portion of barcode image 30 used to convey information to barcode reader 16, and accordingly, indicia 34 may be omitted within a composite image.

Figure 7A:
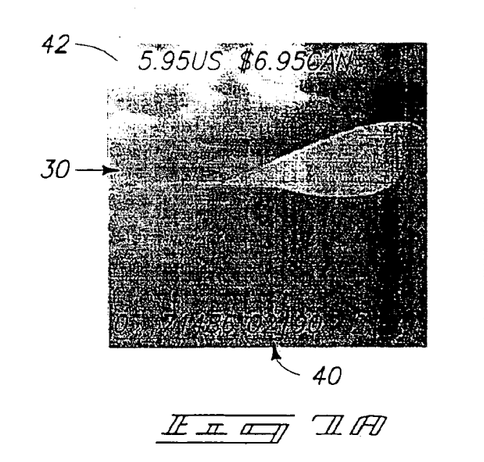
FIGS. 7A and 7B are illustrative representations of composite images according to exemplary embodiments.
Figure 7B:
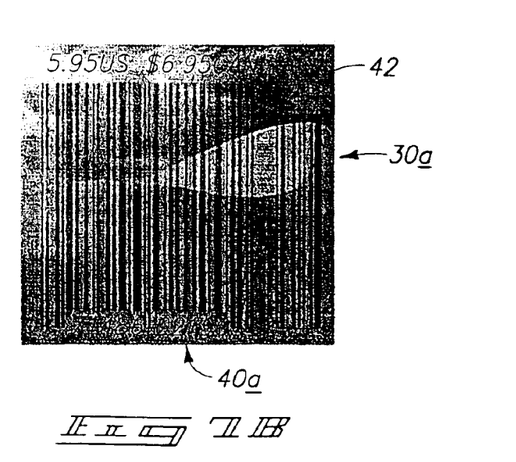

Referring to FIGS. 7A and 7B, exemplary composite images 40, 40a are illustrated for different values of 10% and 50%, respectively, for intensity control (k) for barcode images 30, 30a formed using eqn. 1. Barcode images 30, 30a are embedded within the respective base image 42 comprising a photograph in the exemplary embodiments.

Figure 8A:
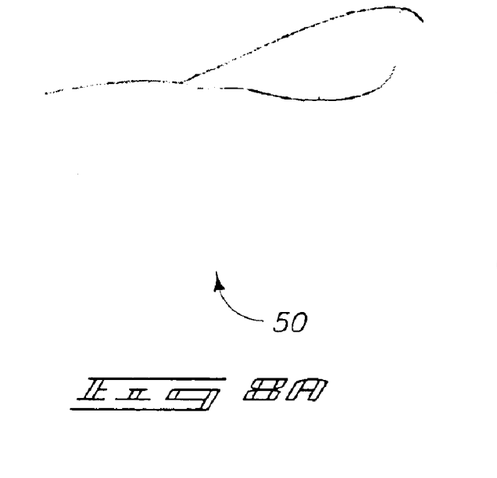
FIGS. 8A and 8B are illustrative representations of barcode image data extracted from the composite images of FIGS. 7A and 7B according to one embodiment.
Figure 8B:
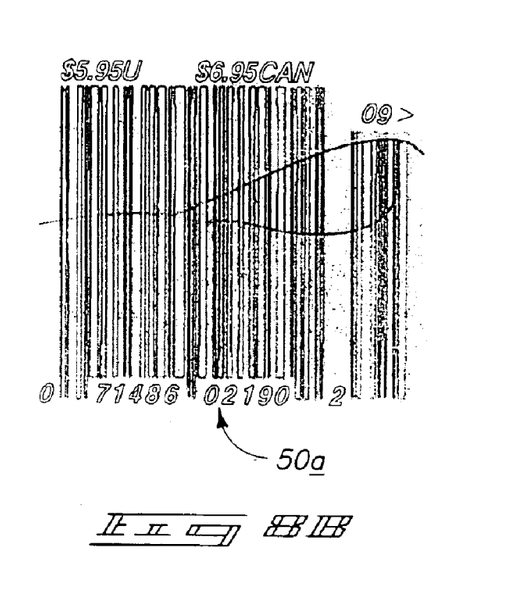

Referring to FIGS. 8A and 8B, the barcode data 50, 50a resulting from the extraction from the respective composite images using edge detection described above is shown.

Figure 9:
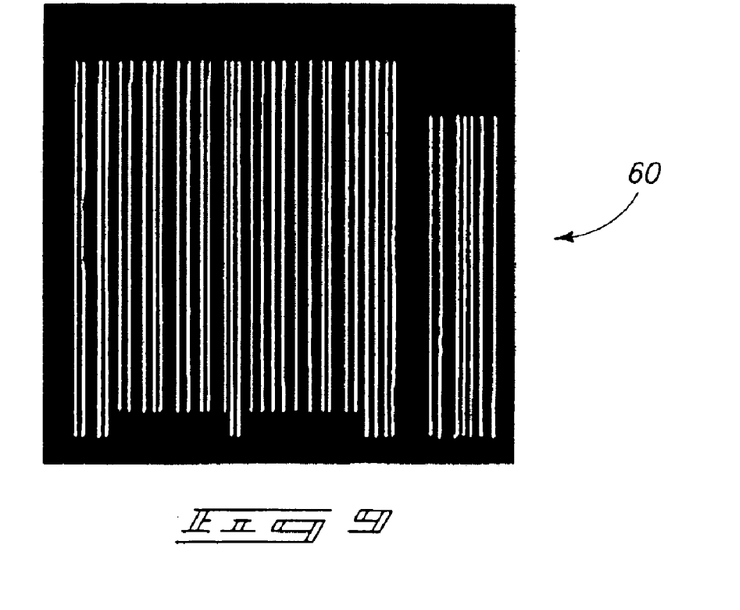
FIG. 9 is an illustrative representation of modified barcode image data according to one embodiment.

Referring to FIG. 9, barcode data 60 corresponding to further processing of the data 50, 50a of FIG. 8A or 8B is shown. Exemplary further processing includes elimination of horizontal edges, edge linking, and/or reduction of edges which are relatively short compared with dominant edges. Barcode data 60 comprises a plurality of vertical lines formed by the extracted and processed edge segments. The vertical lines may correspond to boundaries of bars of the original barcode images 30, 30a.

Figure 10:
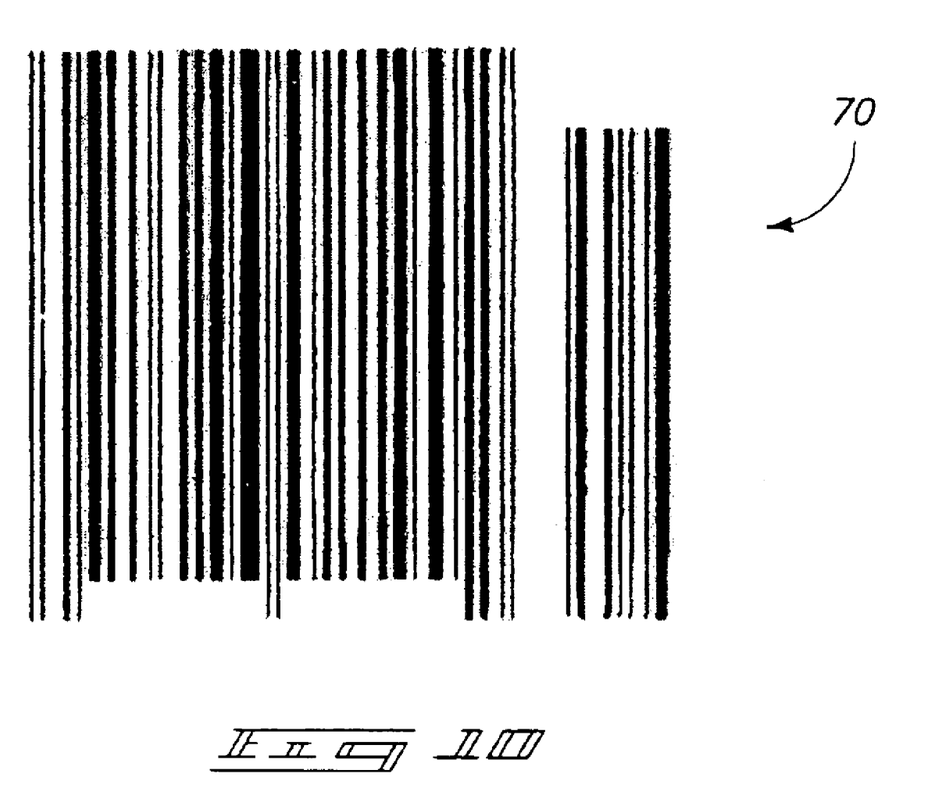
FIG. 10 is an illustrative representation of a reconstructed barcode image according to one embodiment.

Referring to FIG. 10, barcode data 70 is illustrated corresponding to filled-in pairs of lines of FIG. 9. Barcode data 70 may be displayed using barcode generation device 14 for reading or scanning using barcode reader 16. In some embodiments, a less than exact replication (e.g., no indicia 34) of the original respective barcode image 30, 30a is adequate for reading using the respective barcode reader 16. Other processing may be used in other embodiments. For example, the alternating black and white bars of the exemplary UPC barcode images 30, 30a may be provided using other processing techniques.

According to embodiments described herein, exemplary methods and apparatus for disguising barcode images within respective base images are described. At least one embodiment provides inconspicuously blending a barcode image within a base image. Image-processing techniques may be employed to extract, enhance and reconstruct the barcode image from the base image. The reconstructed barcode image may be displayed and read by an appropriate barcode reading device. At least some embodiments of the disclosure have the benefits of minimizing impact of barcode image embedding to the base image (e.g., reducing the impact of the barcode image on products, objects, places, etc.), the barcode image is entirely embedded in its original form, the image processing is relatively straightforward, and/or a standard barcode reader may be used to read the reconstructed barcode image. Using embodiments described herein, attractive composite images are provided and manufacturers or other entities may be less reluctant to have barcode images (e.g., UPC barcodes or others) printed on their products or packaging for their products.

The protection sought is not to be limited to the disclosed embodiments, which are given by way of example only, but instead is to be limited only by the scope of the appended claims.

What is claimed is:

1. A barcode embedding method comprising:

providing a base image;

providing a barcode format;

providing information to be communicated using a barcode image;

encoding the information according to the barcode format to provide barcode data for the barcode image, wherein the barcode data comprises digital data configured to generate a graphical representation of the barcode image;

creating a watermark image comprising the barcode data; and embedding the watermark image within the base image providing a composite image.

2. The method of claim 1 wherein the barcode image is disguised within the watermark image embedded within the composite image.

3. The method of claim 1 wherein the barcode data of the composite image is of a form which may not be directly read from the composite image using a barcode reader after the embedding.

4. The method of claim 1 wherein the composite image does not comprise a human visible version of the barcode image after the embedding.

5. The method of claim 1 wherein the composite image does not comprise a human visible version of the watermark image after the embedding.

6. The method of claim 1 further comprising generating watermark data comprising digital data configured to generate the watermark image, and wherein the generating comprises generating using the digital data of the barcode data and the creating comprises creating the watermark image using the watermark data.

7. A barcode communication method comprising:
providing barcode data regarding a barcode image, the barcode data comprising digital data configured to generate a graphical representation of the barcode image including information to be communicated using the barcode image;
first embedding the barcode data comprising the information within a watermark image; and
second embedding the watermark image comprising the embedded barcode data within a base image.

8. The method of claim 7 wherein the barcode data does not comprise a graphical representation of a barcode image.

9. The method of claim 7 wherein the barcode data comprises a graphical representation of a barcode image.

10. The method of claim 7 further comprising:
retrieving watermark data corresponding to the watermark image from the composite image;
processing the watermark data to extract the barcode data after the retrieving; and
depicting a barcode image using the barcode data after the processing.

11. The method of claim 10 further comprising directly reading the barcode image using a barcode reader to access the information.

12. The method of claim 7 wherein the providing the barcode data comprises:
providing the information;
providing a barcode format; and
encoding the information according to the barcode format.

13. The method of claim 7 wherein the barcode image is disguised within the watermark image embedded within the composite image.

14. The method of claim 7 wherein the barcode data of the composite image is in a form which may not be directly read from the composite image using a barcode reader after the embeddings.

15. The method of claim 7 wherein the composite image does not comprise a human visible version of the barcode image after the embeddings.

16. The method of claim 7 wherein the composite image does not comprise a human visible version of the watermark image after the embeddings.

17. A barcode extraction method comprising:
accessing a composite image;
extracting watermark data from the composite image;
processing the watermark data to extract barcode data after the extracting; and
processing the barcode data to represent a barcode image corresponding to the extracted barcode data.

18. The method of claim 17 wherein the processing the barcode data to represent the barcode image comprises displaying a graphical representation of the barcode image.

19. The method of claim 17 wherein the processing the barcode data to represent the barcode image comprises modulating a light source to represent the barcode image.

20. The method of claim 17 wherein the barcode data may not be directly read from the composite image using a barcode reader.

21. The method of claim 17 further comprising graphically displaying the barcode image after the extracting and the processings.

22. A barcode system comprising:
a watermark processor configured to access a composite image, to identify a watermark image embedded within the composite image, to extract watermark data of the watermark image from the composite image, and to extract barcode data regarding a barcode image from the watermark data; and
a barcode generation device coupled with the watermark processor and configured to access the barcode data and to form a barcode image using the barcode data.

23. The system of claim 22 further comprising a watermark embedding system configured to access a base image, to access information to be communicated, to access a barcode format, to encode the information according to the barcode format to provide the barcode data, to embed the barcode data within the watermark image, and to embed the watermark image within the base image to create the composite image.

24. The system of claim 22 wherein the barcode image is disguised within the watermark image embedded within the composite image.

25. The system of claim 22 wherein the barcode data of the composite image is in a form which may not be directly read from the composite image using a barcode reader.

26. The system of claim 22 wherein the composite image does not comprise a human visible version of the barcode image.

27. The system of claim 22 wherein the composite image does not comprise a human visible version of the watermark image.

28. The system of claim 22 wherein the barcode generation device comprises an image device configured to depict the barcode image formed using the extracted barcode data.

29. The system of claim 28 further comprising a barcode reader optically coupled with the image device and configured to read the barcode image depicted using the image device to extract information to be communicated and encoded within the barcode image.

30. The system of claim 22 wherein the barcode generation device is configured to generate a graphical representation of the barcode image to form the barcode image.

31. An article of manufacture comprising:
a processor-usable medium comprising processor-usable code configured to cause processing circuitry to:
access a base image;
access information to be communicated using a barcode image;
encode the information using a barcode format to provide barcode data, wherein the barcode data comprises digital data configured to generate a graphical representation of the barcode image;
create a watermark image comprising the barcode data; and
embed the watermark image within the base image providing a composite image.

32. The article of claim 31 wherein the barcode image is disguised within the watermark image embedded within the composite image.

33. The article of claim 31 wherein the barcode data of the composite image is in a form which may not be directly read from the composite image using a barcode reader after the embedding.

34. The article of claim 31 wherein the composite image does not comprise a human visible version of the barcode image after the embedding.

35. The article of claim 31 wherein the composite image does not comprise a human visible version of the watermark image after the embedding.

* * * * *